US009207816B2

(12) United States Patent
Yang et al.

(10) Patent No.: US 9,207,816 B2
(45) Date of Patent: Dec. 8, 2015

(54) METHOD OF DISTINGUISHING OBJECTS ON TOUCH PANEL BY REFERRING TO INDUCED CAPACITANCE SIGNAL DISTRIBUTIONS, AND RELATED COMPUTER READABLE MEDIUM THEREOF

(75) Inventors: Tung-Ming Yang, Changhua County (TW); Wei-Kuo Mai, Hsinchu (TW)

(73) Assignee: ELAN MICROELECTRONICS CORPORATION, Science Industrial Park, HsinChu (TW)

(*) Notice: Subject to any disclaimer, the term of this patent is extended or adjusted under 35 U.S.C. 154(b) by 339 days.

(21) Appl. No.: 13/471,434

(22) Filed: May 14, 2012

(65) Prior Publication Data

US 2012/0306806 A1   Dec. 6, 2012

(30) Foreign Application Priority Data

May 30, 2011   (TW) .............................. 100118965 A

(51) Int. Cl.
*G06F 1/00*   (2006.01)
*G06F 3/044*   (2006.01)
*G06F 3/041*   (2006.01)

(52) U.S. Cl.
CPC .............. *G06F 3/044* (2013.01); *G06F 3/0416* (2013.01); *G06F 2203/04104* (2013.01)

(58) Field of Classification Search
CPC ............................ G02F 1/0126; G02F 1/1396
USPC ...................... 345/173, 178, 174, 179, 66, 67
See application file for complete search history.

(56) References Cited

U.S. PATENT DOCUMENTS

| 2004/0217945 A1* | 11/2004 | Miyamoto et al. | 345/173 |
| 2008/0252615 A1* | 10/2008 | Shipton | 345/174 |
| 2011/0032210 A1* | 2/2011 | Chou et al. | 345/174 |
| 2011/0157058 A1* | 6/2011 | Bita et al. | 345/173 |

FOREIGN PATENT DOCUMENTS

| CN | 101901074 A | 12/2010 |
| CN | 102043506 A | 5/2011 |
| TW | 201112082 | 4/2011 |

\* cited by examiner

*Primary Examiner* — Michael Faragalla
(74) *Attorney, Agent, or Firm* — Winston Hsu; Scott Margo

(57) ABSTRACT

A method of distinguishing a plurality of objects on a touch panel includes: scanning the touch panel to obtain a plurality of positions corresponding to the objects on the touch panel and a plurality of induced capacitance signals corresponding to the positions; identifying a plurality of maximum induced capacitance signals corresponding to the objects respectively; and distinguishing the objects by referring to induced capacitance signal distributions around the maximum induced capacitance signals.

18 Claims, 10 Drawing Sheets

METHOD OF DISTINGUISHING OBJECTS ON TOUCH PANEL BY REFERRING TO INDUCED CAPACITANCE SIGNAL DISTRIBUTIONS, AND RELATED COMPUTER READABLE MEDIUM THEREOF

BACKGROUND OF THE INVENTION

1. Field of the Invention

The disclosed embodiments of the present invention relate to a method of distinguishing objects on a touch panel, and more particularly, to a method of distinguishing objects (e.g., fingers of a user and a capacitive stylus/touch pen held by the user) on a touch panel by referring to induced capacitance signal distributions.

2. Description of the Prior Art

When information is inputted through a touch panel, different input sources have to be identified for obtaining the correct information. For example, when a user's hand holds a capacitive stylus to write on a touch panel, a technique of identifying the capacitive stylus needs to be employed to avoid misrecognizing the user's hand as the capacitive stylus. As shown in FIG. 1, a conventional method for solving the misrecognition is to restrict the range of writing of the capacitive stylus by modifying the hardware of the input apparatus (e.g., a touch panel 100). However, the restricted area of writing would lead to input inconvenience due to its small size, and users have to write within the restricted range. As the technique develops, writing with the capacitive stylus on the tablet computer panel is more convenient, which may increase the probability that the user's hand and the capacitive stylus contact the touch panel simultaneously. Although the conventional method which restricts the range of writing shown in FIG. 1 can solve the misrecognition problem, it brings a lot of inconvenience, such as the need to adjust the range of writing frequently.

SUMMARY OF THE INVENTION

One of the objectives of the present invention is to provide a method of distinguishing objects on a touch panel, where the method can be employed to distinguish between a hand and a capacitive stylus when a user holds the capacitive stylus in the hand to write or draw on the touch panel.

According to an embodiment of the present invention, an exemplary method of distinguishing a plurality of objects on a touch panel is disclosed. The exemplary method includes: scanning the touch panel to obtain a plurality of positions corresponding to the objects on the touch panel and a plurality of induced capacitance signals corresponding to the positions; identifying a plurality of maximum induced capacitance signals corresponding to the objects respectively; and distinguishing the objects by referring to induced capacitance signal distributions around the maximum induced capacitance signals.

According to an embodiment of the present invention, an exemplary computer readable medium is disclosed. The exemplary computer readable medium has a program code stored therein. When executed by a processor, the program code causes the processor to execute following steps: scanning the touch panel to obtain a plurality of positions corresponding to the objects on the touch panel and a plurality of induced capacitance signals corresponding to the positions; identifying a plurality of maximum induced capacitance signals corresponding to the objects respectively; and distinguishing the objects by referring to induced capacitance signal distributions around the maximum induced capacitance signals.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
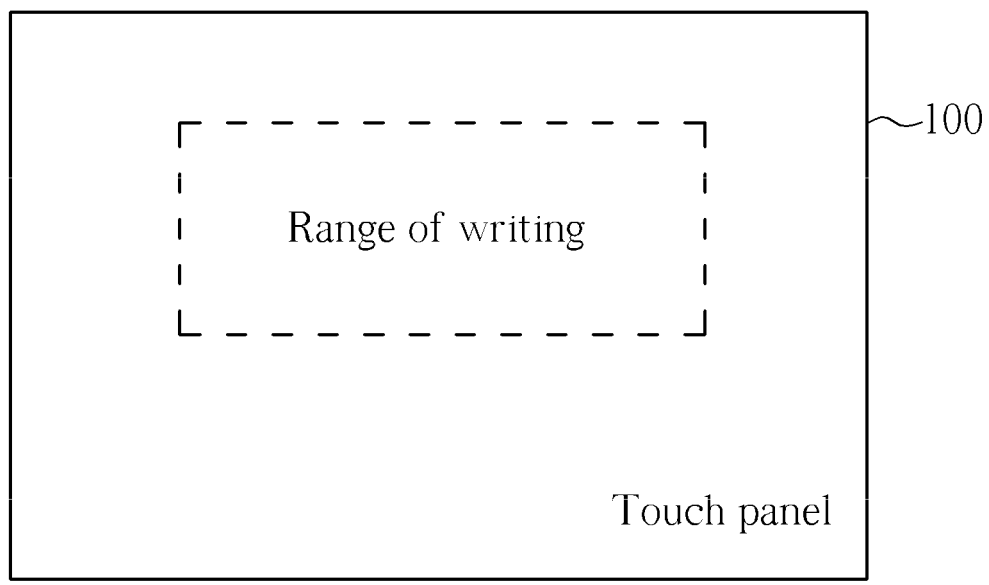
FIG. 1 is a diagram illustrating a conventional touch panel restricting a range of writing.
Figure 2A:
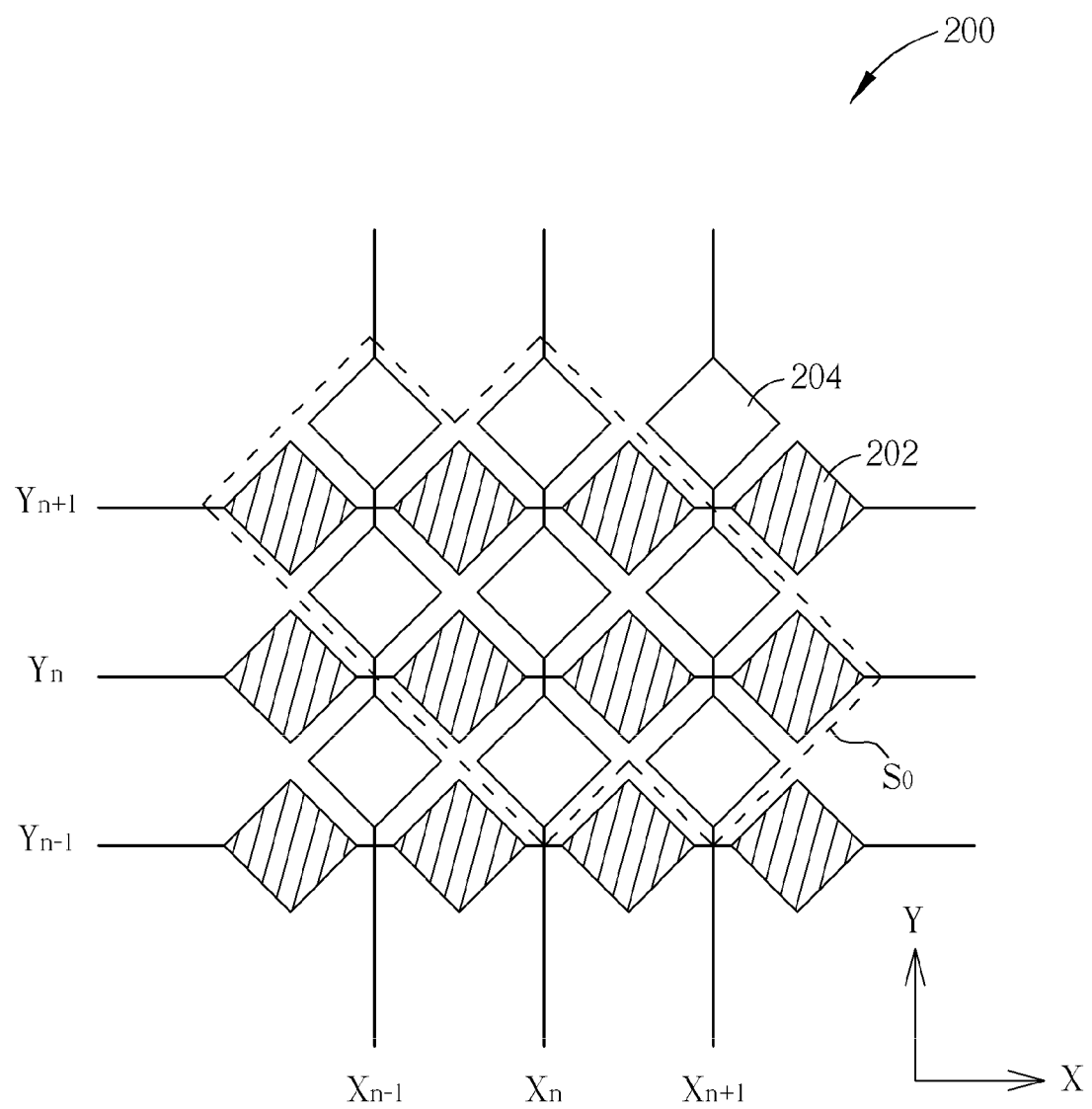
FIG. 2A is a diagram illustrating structure of a capacitive touch panel.

Please refer to FIG. 2A, which is a diagram illustrating a partial structure of a capacitive touch panel 200. The capacitive touch panel 200 includes vertical traces (Y axis) $Y_{n-1}$, $Y_n$, and $Y_{n+1}$ having a plurality of electrodes 202 represented by blocks marked with slash lines, and horizontal traces (X axis) $X_{n-1}$, $X_n$, and $X_{n+1}$ having a plurality of electrodes 204 represented by blank blocks. The Y-axis electrodes and the X-axis electrodes may be disposed in the same plane or different planes. FIG. 2A is an implementation of the sensing structure of the touch panel, and strip electrodes or triangular electrodes may also be used in other implementations.

Figure 2B:
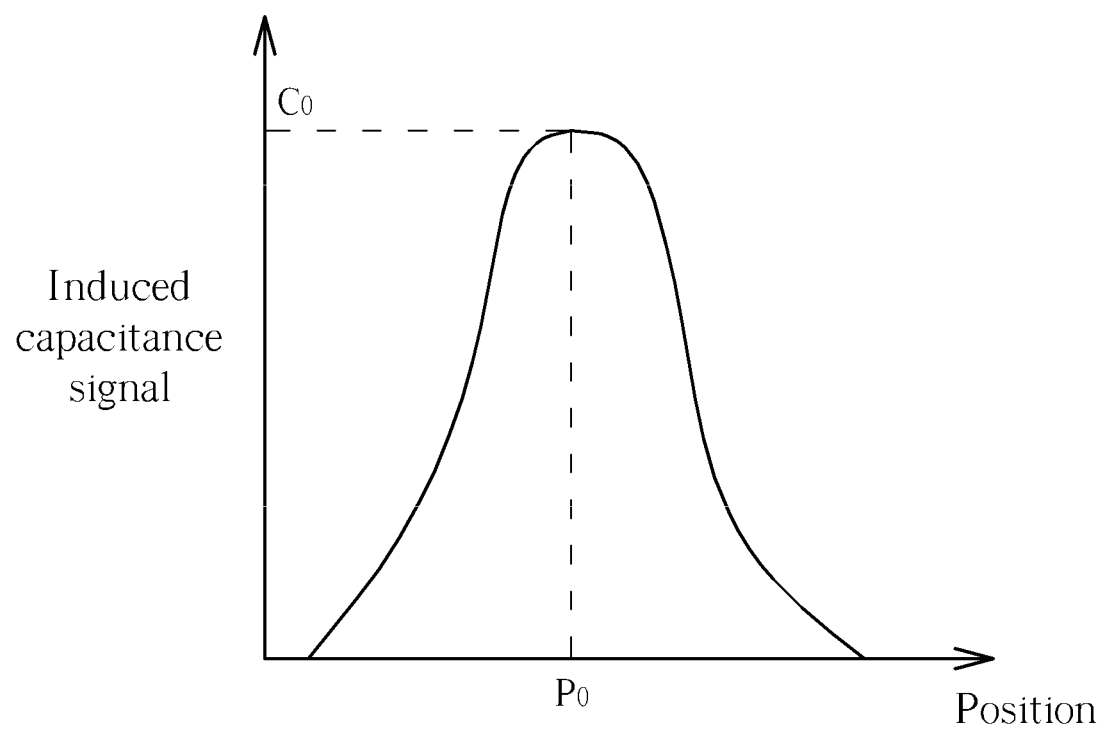
FIG. 2B is a diagram illustrating an induced capacitance signal distribution on a touch panel.
Figure 2C:
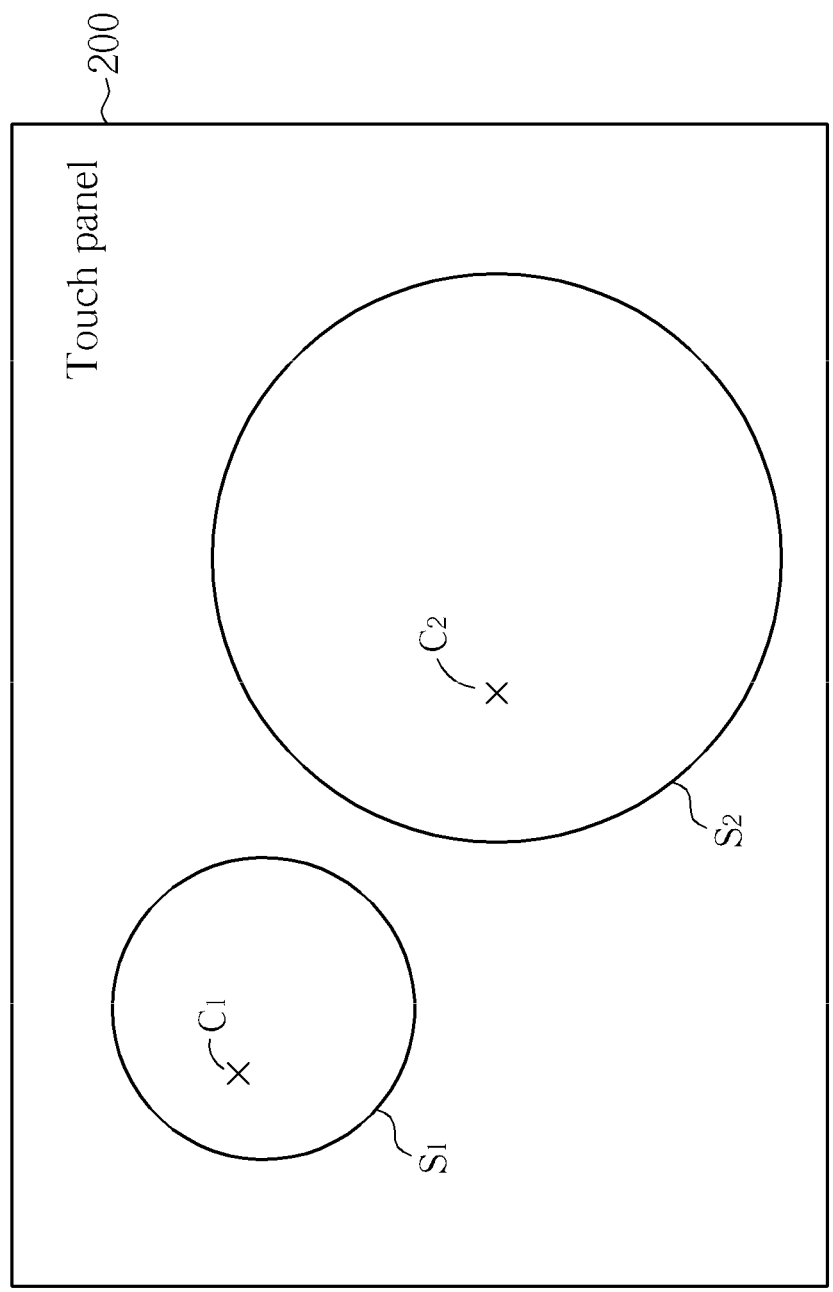
FIG. 2C is a diagram illustrating objects having different conductive properties touching a same touch panel.

A range $S_0$ represents an area where the capacitance value changes when a conductive object touches the touch panel 200. Induced capacitance signals obtained from scanning the touch panel 200 is shown in FIG. 2B, wherein the position on the horizontal axis represents the trace position, the induced capacitance signal on vertical axis represents the change in capacitance, and the waveform represents results measured on the individual traces. For illustrative purposes, the measurement result of the X-axis or Y-axis traces shown in FIG. 2B is a continuous waveform. A position $P_0$ represents a location (e.g., the coordinate $X_n$) corresponding to the maximum induced capacitance signal $C_0$. FIG. 2C is a diagram illustrating two different objects touching the same touch panel 200, wherein symbols $S_1$, $S_2$, $C_1$, and $C_2$ represent induced ranges and maximum induced capacitance signals corresponding to the two objects, respectively. In addition, shapes of the induced ranges $S_1$ and $S_2$ are simplified as circles for illustrative purposes.

A person skilled in the touch technique should understand that different scan manners can generate different scanning results. When a technique known as self-sensing is used to scan m traces in the X-axis direction and n traces in the Y-axis direction, the corresponding scan result may approximate to that shown in FIG. 2B. When a mutual-sensing or all-point scan technique is used, an induced range having a shape similar to a touch finger may be obtained as shown in FIG. 2C. In brief, the proposed method determines types of objects according to scan results, and is therefore applicable to different scan techniques.

Figure 3:
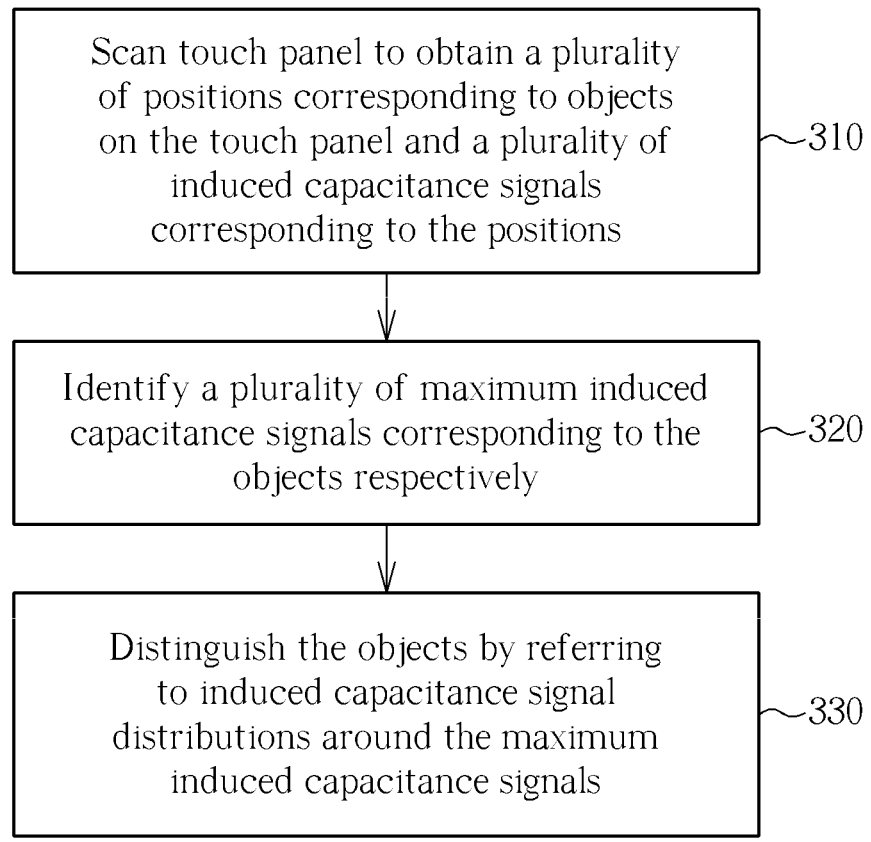
FIG. 3 is a flowchart of an exemplary method of distinguishing a plurality of objects on a touch panel according to an embodiment of the present invention.

FIG. 3 is a flowchart of an exemplary method of distinguishing a plurality of objects on a touch panel according to an embodiment of the present invention. First, in step 310, the flow scans the touch panel to obtain a plurality of positions corresponding to the objects on the touch panel and a plurality of induced capacitance signals corresponding to the positions. Therefore, the induced capacitance signals shown in FIG. 2B and FIG. 2C may be obtained.

Next, in step 320, the flow identifies a plurality of maximum induced capacitance signals corresponding to the objects respectively. In addition, the position information corresponding to the maximum induced capacitance signals is obtained, too. The flow then proceeds to step 330.

In step 330, the flow distinguishes the objects by referring to induced capacitance signal distributions around the maximum induced capacitance signals. Further description is detailed as follows.

Figure 4A:
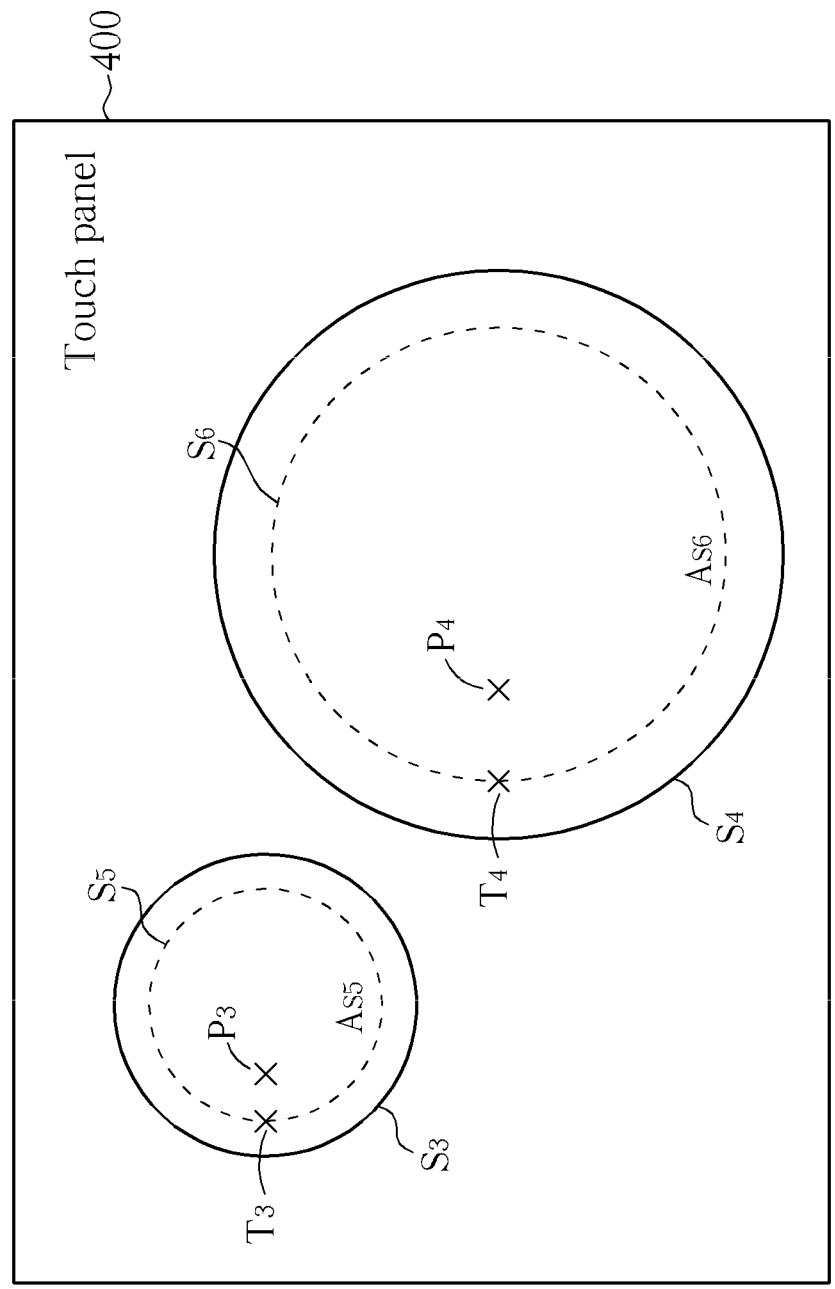
FIG. 4A is a diagram illustrating induced capacitance signal distributions on a touch panel touched by objects having different conductive properties according to an embodiment of the present invention.

FIG. 4A is a diagram illustrating induced capacitance signal distributions on a touch panel 400 touched by different objects. In accordance with the proposed method of the present invention, step 310 shown in FIG. 3 is executed first to obtain induced ranges $S_3$ and $S_4$ corresponding to the objects on the touch panel 400. Step 320 is then executed to find out maximum induced capacitance signals $C_3$ and $C_4$ as well as the corresponding positions $P_3$ and $P_4$. Next, step 330 is executed. In the embodiment shown in FIG. 4A, the positions $T_3$ and $T_4$ are found out first, and then the objects are identified by comparing the induced capacitance signal variation from the position $P_3$ to position $T_3$ with that from the position $P_4$ to position $T_4$. In brief, as described in step 330, the object having more obvious changes in the capacitance signal may be identified as a stylus by referring to induced capacitance signal distributions around the maximum induced capacitance signals.

Figure 4B:
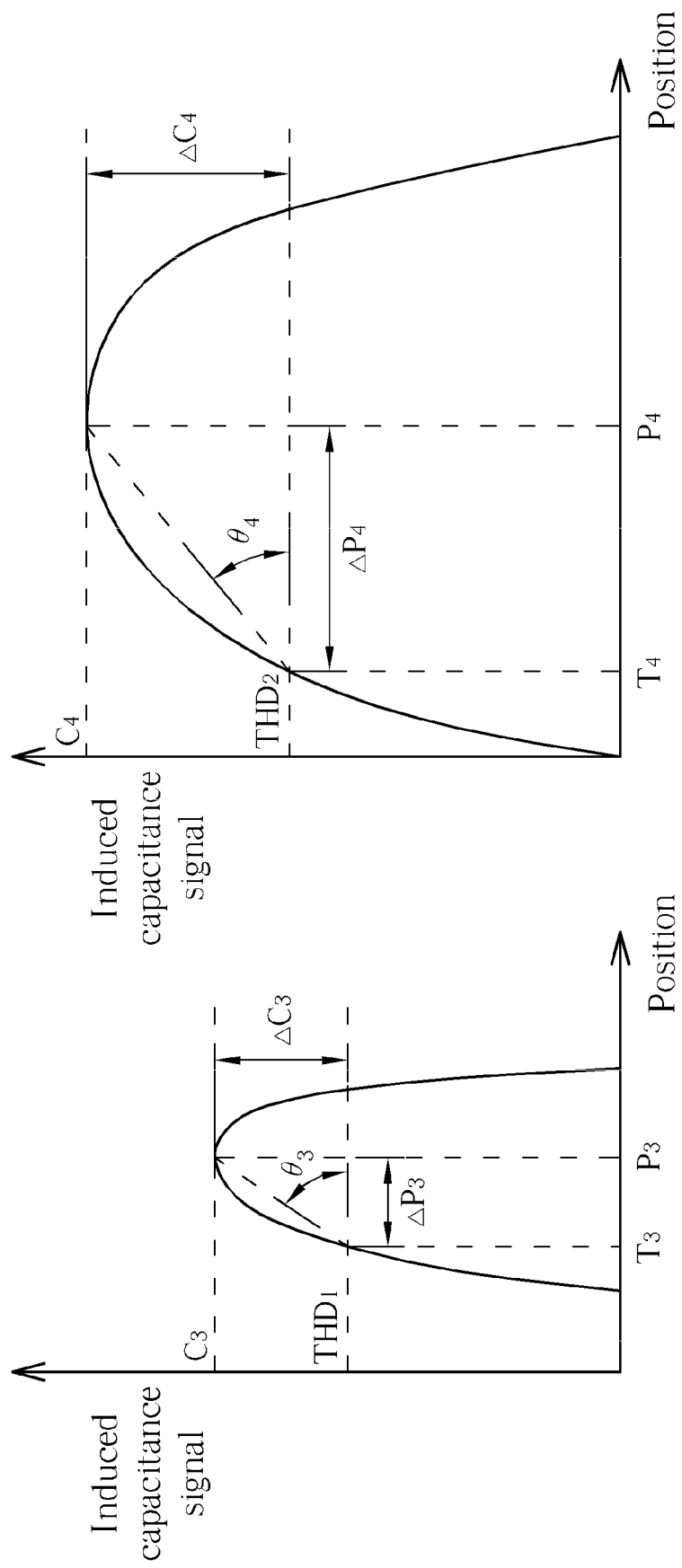
FIG. 4B is a diagram illustrating induced capacitance signal distributions of the objects based on different cross sections shown in FIG. 4A.

The method for determining the positions $T_3$ and $T_4$ is described as follows. First, a predetermined proportion of the maximum induced capacitance signal is selected as a threshold value. Ranges S5 and S6 depicted by dotted lines are thus obtained from the ranges S3 and S4 based on the threshold values THD1 and THD2, wherein induced capacitance signals within the range S5 are larger than or equal to the threshold value THD1, and induced capacitance signals within the range S6 are larger than or equal to the threshold value THD2. Next, distances from positions $P_3$ and $P_4$ to these positions on boundaries of the ranges S5 and S6 are compared respectively, and positions nearest to the position $P_3$ and $P_4$ are determined as the positions $T_3$ and $T_4$ respectively. In FIG. 4A and FIG. 4B, the threshold values THD1 and THD2 are set to 60% of the maximum induced capacitance signals $C_3$ and $C_4$ (i.e., THD1=$C_3$*60% and THD2=$C_4$*60%). Certainly, in other implementations, the threshold values can be set by any predetermined proportion of the maximum induced capacitance signals, respectively.

The following describes the procedure for distinguishing the objects by the induced capacitance signal distributions. Please refer to FIG. 4B, which is a diagram illustrating induced capacitance signal distributions corresponding to cross sections along a path from position $P_3$ to position $T_3$ and another path from position $P_4$ to position $T_4$, respectively. First, differences $\Delta C_3$ and $\Delta C_4$ between the maximum induced capacitance signals $C_3$ and $C_4$ and the threshold values THD1 and THD2 are calculated, respectively. Next, differences $\Delta P_3$ and $\Delta P_4$ between the positions $P_3$ and $P_4$ and positions $T_3$ and $T_4$ are calculated, respectively. In addition, ratios $\Delta V_3$ and $\Delta V_4$ are then calculated according to the differences $\Delta C_3$ and $\Delta C_4$ and the differences $\Delta P_3$ and $\Delta P_4$, respectively. Finally, the objects are differentiated according to ratios $\Delta V_3$ and $\Delta V_4$, which may be mathematically expressed as follows.

$$\text{First ratio (slope): } \Delta V_3 = \frac{\Delta C_3}{\Delta P_3}.$$

$$\text{Second ratio (slope): } \Delta V_4 = \frac{\Delta C_4}{\Delta P_4}.$$

As the differences $\Delta C_3$ and $\Delta P_3$ may form two sides of a triangle shown in FIG. 4B and the differences $\Delta C_4$ and $\Delta P_4$ may form two sides of a triangle shown in FIG. 4B, the objects can be differentiated by calculating angle values $\theta_3$ and $\theta_4$ corresponding to individual objects based on the geometric property of the right triangle. In addition, the objects may also be differentiated by trigonometric values $\tan \theta_3$ and $\tan \theta_4$, other related trigonometric values, or other related angle values.

In one embodiment, by comparing the first ratio with the second ratio, the object having larger ratio may be determined as the first object (e.g., the stylus), and the object having smaller ratio may be determined as the second object (e.g., the finger or palm). In another embodiment, objects are differentiated based on a threshold. For example, an object is recognized as a stylus if the ratio of the object is larger than a predetermined threshold; otherwise, the object is recognized as a finger or palm.

Considering an alternative design of the present invention, in a case where the maximum capacitance signals $C_3$ and $C_4$ corresponding to different objects are equal to each other (i.e., $C_3=C_4$) and both of the threshold values THD1 and THD2 are set to be a predetermined proportion of the maximum induced capacitance signals $C_3$ and $C_4$, the objects may also be differentiated using following two ratios.

$$\text{Third ratio: } \Delta V_3' = \frac{1}{\Delta P_3}$$

$$\text{Forth ratio: } \Delta V_4' = \frac{1}{\Delta P_4}$$

That is, each of the above two ratios is a reciprocal of a specific distance between the position of the maximum induced capacitance signal and the position of the threshold value for each object. Therefore, in a case where the induced capacitance signal differences $\Delta C_3$ and $\Delta C_4$ are equal to each other, the objects may be simply differentiated by comparing the distance differences $\Delta P_3$ and $\Delta P_4$ only.

As can be understood from the above-mentioned embodiment, the slope between two points may represent the induced capacitance signal distribution. In one embodiment, two arbitrary positions within the ranges S3 and S4 and corresponding capacitance signals may be selected for calculation. In other words, it is not necessary that positions having the maximum capacitance signals must be selected. In addition, the selected two positions may be actual positions of sensing electrodes or obtained from mathematical manipulation.

In fact, induced capacitance signals of sensing electrodes corresponding to the positions $T_3$ and $T_4$ are Ca and Cb, respectively, wherein the induced capacitance signal Ca may not be equal to the threshold value THD1, and the induced capacitance signal Cb may not be equal to the threshold value THD2. In the above embodiments, in order to facilitate description and calculation, the value Ca is replaced by the threshold value THD1, and the value Cb is replaced by the threshold value THD2. In actual applications, using the threshold values THD1 and THD2 or the values Ca and Cb for the aforementioned slope calculation is feasible. Please note that this is for illustrative purposes only, and is not meant to be a limitation of the present invention.

In another embodiment, objects may be differentiated by a ratio of a capacitance signal difference $\Delta C$ to a selected area A (i.e., $\Delta C/A$), wherein the capacitance signal difference $\Delta C$ may be the aforementioned difference $\Delta C_3/\Delta C_4$, and the selected area may be the area $A_{S5}/A_{S6}$ of the induced range S5/S6 or a circular area having a radius of the distance difference $\Delta P_3/\Delta P_4$. In addition, in a case where the maximum capacitance signals corresponding to different objects are equal to each other and both of the threshold values THD1 and THD2 are set to be a predetermined proportion of the maximum induced capacitance signals, the objects may be simply differentiated by comparing the selected areas.

Figure 5:
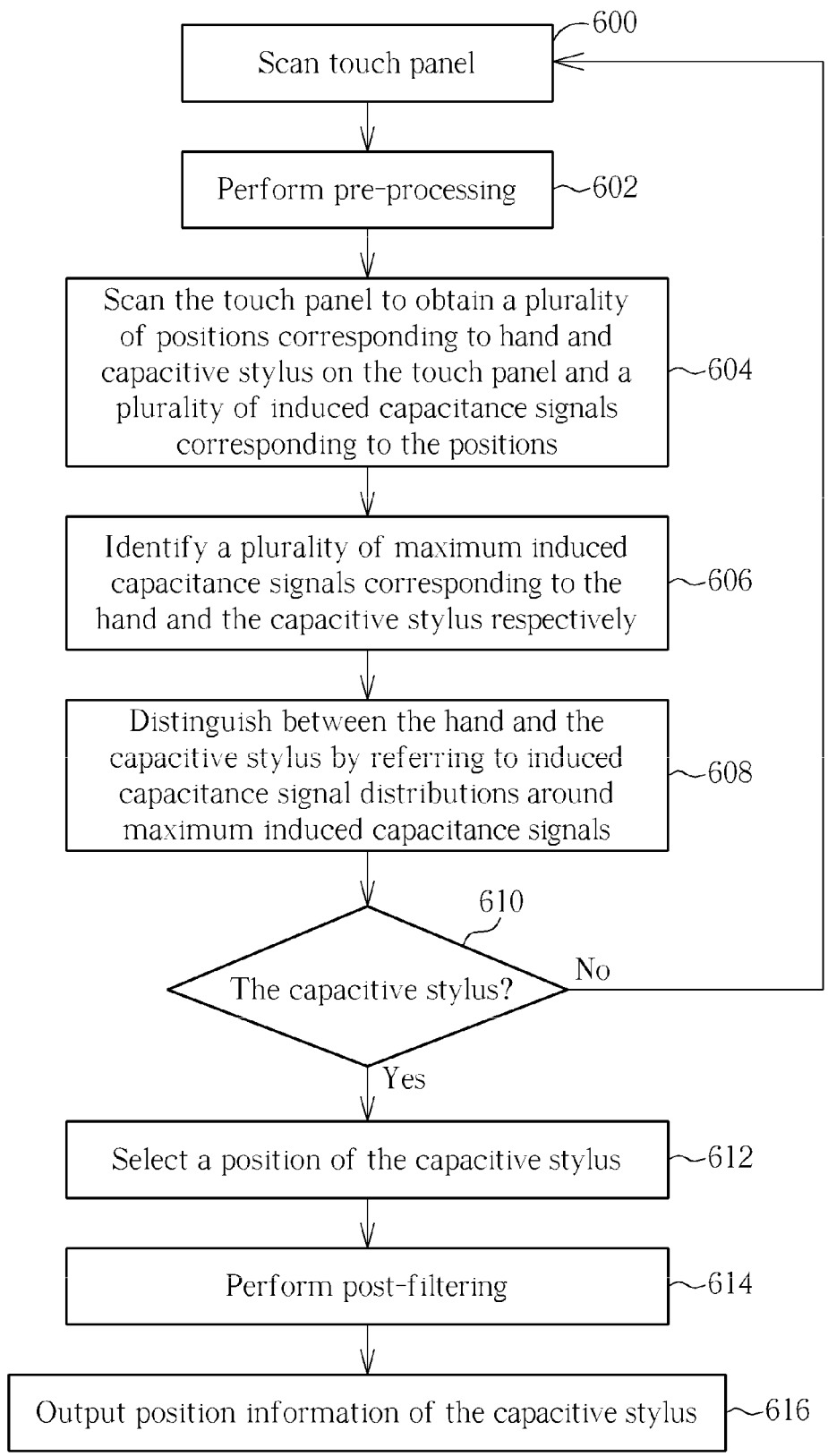
FIG. 5 is a diagram illustrating a flowchart of another exemplary method of distinguishing a plurality of objects according to another embodiment of the present invention.

Please refer to FIG. 5, which is a diagram illustrating a flowchart of an exemplary method of distinguishing a plurality of objects (i.e., a capacitive stylus and a hand on a touch panel) according to an embodiment of the present invention. Steps are described as follows.

Step 600: Scan a touch panel.

Step 602: Perform pre-processing.

Step 604: Scan the touch panel to obtain a plurality of positions corresponding to the hand and the capacitive stylus on the touch panel and a plurality of induced capacitance signals corresponding to the positions.

Step 606: Identify a plurality of maximum induced capacitance signals corresponding to the hand and the capacitive stylus respectively, and obtain positions corresponding to the maximum induced capacitance signals.

Step 608: Distinguish between the hand and the capacitive stylus by referring to induced capacitance signal distributions around the maximum induced capacitance signals.

Step 610: Check if the capacitive stylus is distinguished. If yes, go to step 612; otherwise, proceed to step 600.

Step 612: Select a position of the capacitive stylus.

Step 614: Perform post-filtering.

Step 616: Output position information of the capacitive stylus.

Step 612 is mainly used to determine the position of the capacitive stylus based on the distinguished capacitive stylus, step 602 is mainly used to filter out unwanted noise interference and perform related signal processing, step 614 is to filter out signal components belonging to the capacitive stylus, and step 616 is mainly used to output the position information of the capacitive stylus to a computer host for further processing. As a person skilled in the art can readily understand the operation of each step shown in FIG. 5 according to the prior art and paragraphs directed to FIGS. 2A-4B of the present invention, further description is omitted here for brevity.

Figure 6:
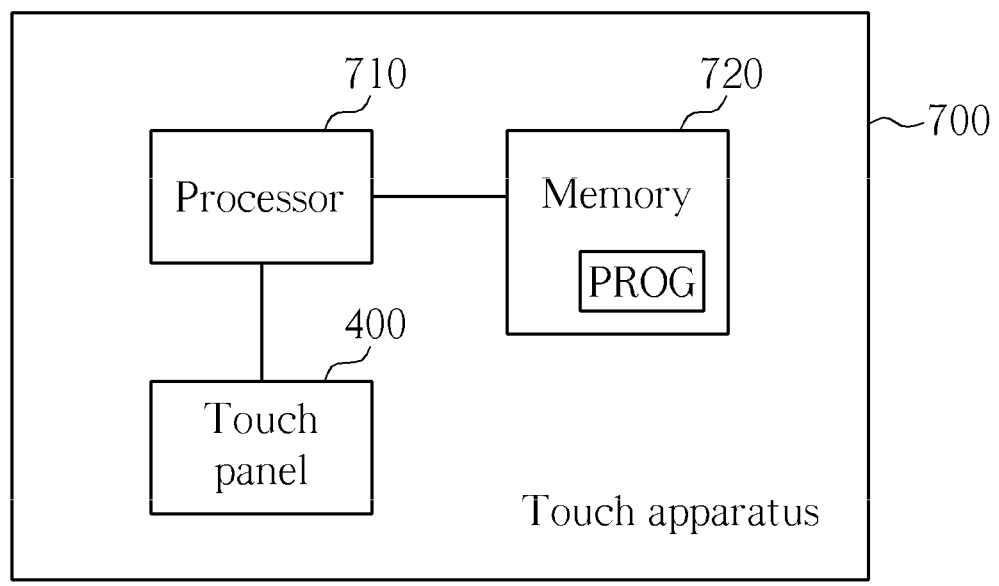
FIG. 6 is a block diagram illustrating a touch apparatus according to an embodiment of the present invention.

Moreover, steps of methods shown in FIG. 3 and FIG. 5 may be implemented in various manners. For example, each step of the proposed method may be translated into a program code PROG by commands, parameters, and variables of a specific program language, wherein the program code PROG is stored in a computer readable medium (e.g., a memory 720 shown in FIG. 6). Therefore, a processor 710 of a related touch apparatus 700 shown in FIG. 6 is instructed to execute each step of the proposed method by reading and executing the program code PROG. The related architecture of the touch apparatus 700 may be represented simply by FIG. 6. In brief, when executed by the processor 710, the program code PROG causes the processor 710 to execute following steps: scanning the touch panel 400 to obtain a plurality of positions corresponding to the objects on the touch panel and a plurality of induced capacitance signals corresponding to the positions; identifying a plurality of maximum induced capacitance signals corresponding to the objects respectively; and distinguishing the objects by referring to induced capacitance signal distributions around the maximum induced capacitance signals.

Figure 7:
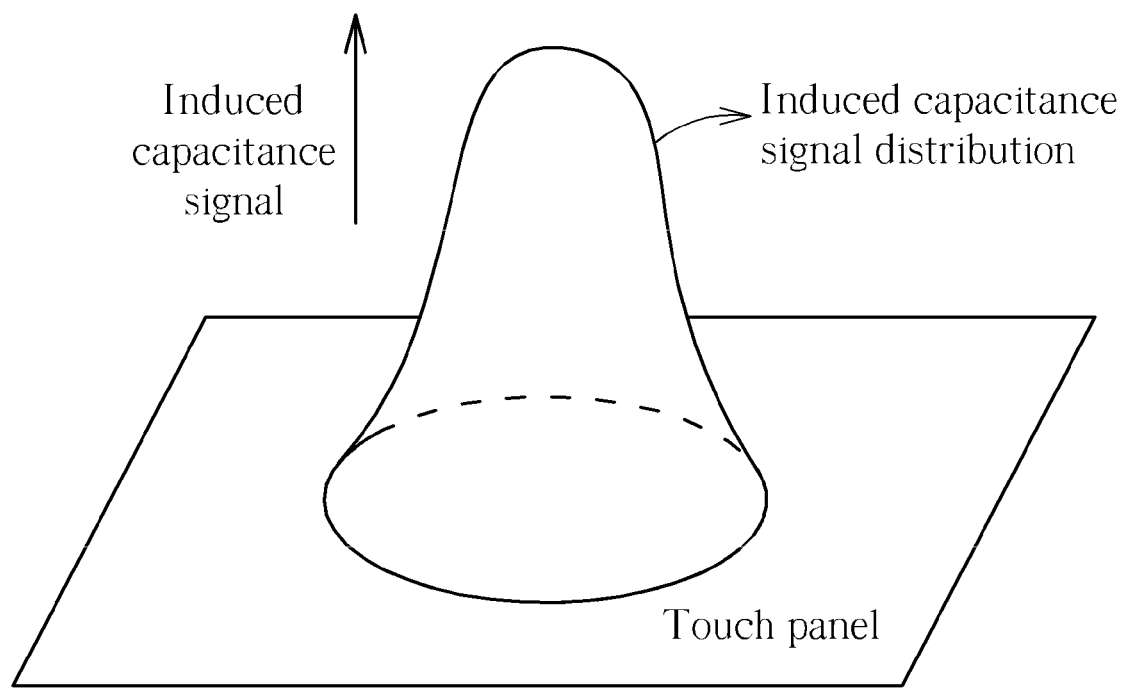
FIG. 7 is a diagram illustrating an induced capacitance signal distribution corresponding to electrodes on a touch panel.

Please refer to FIG. 7, which illustrates an induced capacitance signal distribution by setting a touch panel as a plane and marking a plurality induced capacitance signals corresponding to a plurality of electrodes on the touch panel. As the induced capacitance signal distribution may change with different objects, the aforementioned program code PROG may also derive the graphical depiction of the induced capacitance signal distribution shown in FIG. 7, such that the processor 710 is allowed to execute the depiction of the induced capacitance signal distribution for analysis or comparison with a database (not shown) stored in the computer readable medium (e.g., the memory 720). For example, induced capacitance signal distributions of a capacitive stylus and a hand are stored in the computer readable medium. When the capacitive stylus and the hand touch the touch panel simultaneously, the processor can execute the depiction of the induced capacitance signal distributions for analysis or comparison with a database. In this way, the capacitive stylus and the hand may be distinguished from each other. This modification also obeys the spirit of the present invention.

Furthermore, the proposed method is applicable to scan results obtained in different scan manners (e.g., embodiments disclosed in FIG. 2B, FIG. 7, FIG. 4A, etc.). Regarding the induced capacitance signal waveform obtained by scanning the X-axis/Y-axis traces, objects can be distinguished according to the aforementioned slope relation, too.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of distinguishing a plurality of objects on a touch panel, comprising:

scanning the touch panel to obtain a plurality of positions in a plurality of first induced ranges corresponding to the objects respectively on the touch panel, and obtain a plurality of induced capacitance signals corresponding to the positions;

identifying a plurality of maximum induced capacitance signals in the first induced ranges corresponding to the objects respectively; and distinguishing types of the objects by referring to induced capacitance signal distributions around the maximum induced capacitance signals.

2. The method of claim 1, wherein the step of distinguishing the objects comprises:
regarding each of the objects:
on the touch panel, selecting a first induced capacitance signal around a maximum induced capacitance signal corresponding to the object or a first position corresponding to the first induced capacitance signal, and selecting a second induced capacitance signal around the maximum induced capacitance signal corresponding to the object or a second position corresponding to the second induced capacitance signal; and
differentiating the objects according to a plurality of first and second induced capacitance signals corresponding to the objects respectively, and a plurality of first and second positions corresponding to the first and second induced capacitance signals.

3. The method of claim 2, wherein the first induced capacitance signal is the maximum induced capacitance signal corresponding to the object.

4. The method of claim 2, wherein the first induced capacitance signal is the maximum induced capacitance signal corresponding to the object, and the second induced capacitance signal is a threshold value corresponding to the object.

5. The method of claim 4, wherein the threshold value is a predetermined proportion of the maximum induced capacitance signal corresponding to the object.

6. The method of claim 2, wherein the step of differentiating the objects comprises:
regarding each of the objects:
calculating a first difference between the first and the second induced capacitance signals corresponding to the object;
calculating a second difference between the first and the second positions corresponding to the object; and
calculating a ratio according to the first difference and the second difference; and
differentiating the objects according to ratios corresponding to the objects respectively.

7. The method of claim 2, wherein the step of differentiating the objects comprises:
regarding each of the objects:
calculating a first difference between the first and the second induced capacitance signals corresponding to the object;
calculating a second difference between the first and the second positions corresponding to the object; and
calculating an angle value according to the first difference and the second difference; and
differentiating the objects according to angle values corresponding to the objects respectively.

8. The method of claim 2, wherein the step of differentiating the objects comprises:
regarding each of the objects:
calculating a first difference between the first and the second induced capacitance signals corresponding to the object;
calculating a second difference between the first and the second positions corresponding to the object; and
calculating a trigonometric value according to the first difference and the second difference; and
differentiating the objects according to trigonometric values corresponding to the objects respectively.

9. The method of claim 2, wherein when the first induced capacitance signals corresponding to the objects respectively are equal to each other and the second induced capacitance signals corresponding to the objects respectively are equal to each other, the step of differentiating the objects comprises:
regarding each of the objects:
calculating a specific distance between the first and the second positions corresponding to the object; and
differentiating the objects according to calculated specific distances corresponding to the objects respectively.

10. The method of claim 2, wherein the step of selecting a first induced capacitance signal around a maximum induced capacitance signal corresponding to the object or a first position corresponding to the first induced capacitance signal, and selecting a second induced capacitance signal around the maximum induced capacitance signal corresponding to the object or a second position corresponding to the second induced capacitance signal comprises:
determining a second induced range according to a threshold value, wherein induced capacitance signals corresponding to the object within the second induced range are larger than or equal to the threshold value; and
selecting the first induced capacitance signal and the first position corresponding thereto, and the second induced capacitance signal and the second position corresponding thereto among the induced capacitance signals within the second induced range.

11. The method of claim 10, wherein the step of selecting the first induced capacitance signal and the first position corresponding thereto, and the second induced capacitance signal and the second position corresponding thereto among the induced capacitance signals within the second induced range comprises:
selecting the maximum induced capacitance signal as the first induced capacitance signal; and
selecting a position nearest to the first position as the second position among positions on a boundary of the second induced range.

12. The method of claim 1, wherein the step of distinguishing the objects comprises:
regarding each of the objects:
determining a second induced range on the touch panel according to a threshold value, wherein induced capacitance signals corresponding to the object within the second induced range are larger than or equal to the threshold value; and
differentiating the objects according to the maximum induced capacitance signals corresponding to the objects, a plurality of threshold values, and areas of second induced ranges corresponding to the objects.

13. The method of claim 12, wherein the threshold value is a predetermined proportion of the maximum induced capacitance signal corresponding to the object.

14. The method of claim 12, wherein the step of differentiating the objects comprises:
regarding each of the objects:
calculating a difference between the maximum induced capacitance signal and the threshold value corresponding to the object; and
calculating a ratio according to the difference and an area of the second induced range corresponding to the object; and
differentiating the objects according to ratios corresponding to the objects respectively.

15. The method of claim 12, wherein the step of determining the second induced range on the touch panel according to the threshold value comprises:
determining an area of a circle as the area of the second induced range based on a radius which is a shortest distance between one of positions determined according to the threshold value and a position corresponding to the maximum induced capacitance signal.

16. The method of claim 1, wherein the maximum induced capacitance signals respectively corresponding to the objects have a same induced capacitance signal level, and the step of distinguishing the objects comprises:
   regarding each of the objects:
      determining a second induced range according to a threshold value, wherein induced capacitance signals corresponding to the object within the second induced range are larger than or equal to the threshold value; and
      selecting a shortest distance between one of positions corresponding to a boundary of the second induced range and a position corresponding to the maximum induced capacitance signal; and
   differentiating the objects according to shortest distances found in the respective second induced ranges corresponding to the objects respectively.

17. The method of claim 1, wherein the maximum induced capacitance signals respectively corresponding to the objects have a same induced capacitance signal level, and the step of distinguishing the objects comprises:
   determining a second induced range according to a threshold value, wherein induced capacitance signals corresponding to the object within the second induced range are larger than or equal to the threshold value; and
   differentiating the objects according to areas of second induced ranges corresponding to the objects respectively.

18. A non-transitory computer readable medium having a program code stored therein, wherein when executed by a processor, the program code causes the processor to execute following steps:
   scanning the touch panel to obtain a plurality of positions in a plurality of induced ranges corresponding to the objects respectively on the touch panel, and obtain a plurality of induced capacitance signals corresponding to the positions, wherein the induced ranges are associated with the objects, respectively;
   identifying a plurality of maximum induced capacitance signals corresponding to the objects respectively; and
   distinguishing types of the objects by referring to induced capacitance signal distributions around the maximum induced capacitance signals.

* * * * *